(No Model.)
L. B. CHIPMAN.
HAND CORN PLANTER.
No. 267,775. Patented Nov. 21, 1882.
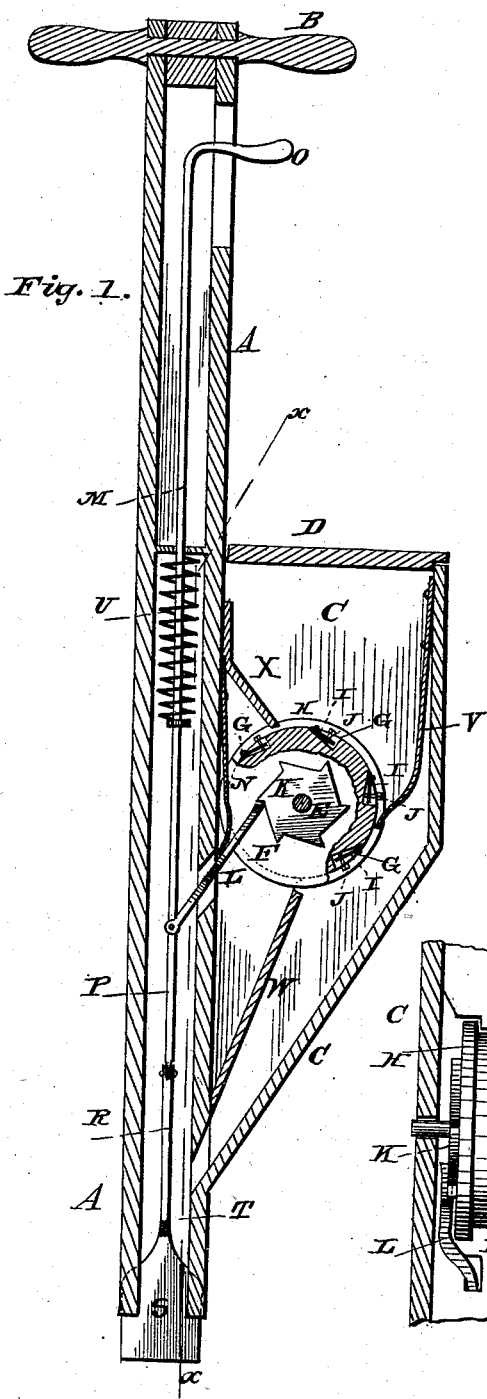
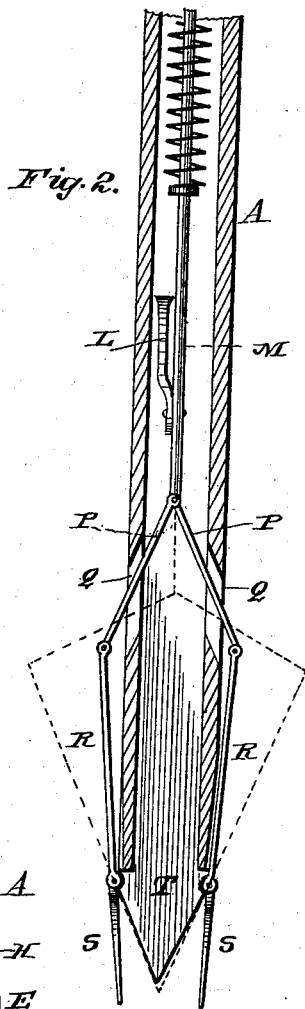
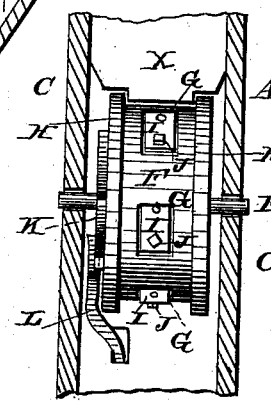
WITNESSES:
INVENTOR.
L. B. Chipman
ATTORNEYS.

UNITED STATES PATENT OFFICE.

LEAVITT B. CHIPMAN, OF OLEOPOLIS, ASSIGNOR OF ONE-HALF TO WILLIAM H. LOOTS, OF OIL CITY, PENNSYLVANIA.

HAND CORN-PLANTER.

SPECIFICATION forming part of Letters Patent No. 267,775, dated November 21, 1882.

Application filed April 14, 1882. (No model.)

*To all whom it may concern:*

Be it known that I, LEAVITT B. CHIPMAN, of Oleopolis, in the county of Venango and State of Pennsylvania, have invented certain new and useful Improvements in Hand Corn-Planters; and I do hereby declare that the following is a full, clear, and exact description of the invention, which will enable others skilled in the art to which it appertains to make and use the same, reference being had to the accompanying drawings, which form a part of this specification.

Figure 1 is a longitudinal vertical sectional view of my improved hand corn-planter. Fig. 2 is a vertical transverse sectional view on the line $x\,x$, Fig. 1; and Fig. 3 is a detail view of the bucket-wheel and the mechanism for operating the same.

Corresponding parts in the several figures are denoted by like letters of reference.

This invention relates to hand corn-planters; and it consists in certain improvements in the construction of the same, which will be hereinafter fully described, and particularly pointed out in the claims.

In the drawings hereto annexed, A represents the rod or leg, which is provided with a suitable handle, B. The hopper C, which is secured upon the side of leg A, is provided, in the usual manner, with a cover, D.

Mounted upon a transverse shaft, E, in the hopper C is a bucket-wheel, F, consisting of a solid wooden disk having beveled recesses or buckets G, formed between the flanges H H. At the upper ends of the said inclined recesses or buckets are secured flat springs I I, the lower or free ends of which are adjustable by set-screws J in the lower ends of the buckets, the size of which may thus be regulated.

K is a ratchet-wheel, firmly secured upon the side of the bucket-wheel, as shown, it being provided with one tooth adjoining each bucket. It is operated by means of a dog or pawl, L, pivoted to a vertically-sliding rod, M, and held in engagement with the ratchet-wheel by a spring, N, secured to the side of leg A. The rod M, which slides in a suitable groove or recess in the said leg A, is provided at its upper end (above the hopper) with a suitable handle, O. To its lower end are pivoted two arms or connecting-rods, P P, extending through slots Q Q, and pivoted to the upper ends of the shanks R of a pair of spades or blades, S S, pivoted to the lower end of the spout T, which forms the lower end of the leg A, and which serve to close its inclined opening, as shown. To force the operating-rod M automatically in a downward position, a coiled spring, U, may be arranged in any suitable manner.

V is a flat spring, secured to the side of the hopper and bearing gently against the face of the bucket-wheel, thus serving to cut off the feed when the latter rotates. A partition, W, arranged below, serves to conduct the seed to the discharge tube or spout. A slanting partition, X, is also arranged in the hopper above the bucket-wheel to prevent the seed from interfering with the motion of the operating-rod.

From the foregoing description, taken in connection with the drawings hereto annexed, the operation and advantages of my invention will be readily understood. The lower end of the spout, with the spades S, being pressed into the ground at the proper place, the operating-rod is raised, thus causing the dog L to move the bucket-wheel forward the space of one bucket, and thus dropping the seed contained in said bucket. When the operating-rod is released the spring U forces it down, thus causing the spades or blades to spring back and close the discharge-opening.

This device is exceedingly simple and inexpensive, and at the same time thoroughly satisfactory in operation.

Having thus described my invention, I claim and desire to secure by Letters Patent of the United States—

1. In a corn-planter, the bucket-wheel F, consisting of a solid disk having inclined recesses or buckets, at the upper ends of which are secured springs I, having their lower ends adjustable by set-screws J, substantially as herein described, for the purpose set forth.

2. In a hand corn-planter, the combination, with the bucket-wheel F, having ratchet-wheel K, of the vertically-sliding rod M, having dog or pawl L, spring N, pivoted arms P P, and the pivoted spades or blades S S, having shanks R, substantially as and for the purpose set forth.

In testimony that I claim the foregoing as my own I have hereto affixed my signature in presence of two witnesses.

LEAVITT BIXBY CHIPMAN.

Witnesses:
    WM. H. LOOTS,
    GEO. W. WHITE.